United States Patent [19]

Okamoto

[11] Patent Number: 5,783,653
[45] Date of Patent: Jul. 21, 1998

[54] DIGITAL VIDEO SUBSTRATE

[75] Inventor: Masaya Okamoto, Ichihara, Japan

[73] Assignee: Idemitsu Petrochemical Co., Ltd., Tokyo, Japan

[21] Appl. No.: 811,717

[22] Filed: Mar. 6, 1997

[30]     Foreign Application Priority Data

Mar. 7, 1996  [JP]  Japan .................................. 8-050557
Mar. 26, 1996 [JP]  Japan .................................. 8-069555
Dec. 6, 1996  [JP]  Japan .................................. 8-326297

[51] Int. Cl.$^6$ ...................................... C08G 64/00
[52] U.S. Cl. ..................... 528/196; 428/64; 428/412;
                                   524/611; 528/202; 528/204; 528/372
[58] Field of Search ................ 428/64, 412; 528/196,
                                   528/202, 204, 372; 524/611

[56]           References Cited

U.S. PATENT DOCUMENTS

| 4,680,374 | 7/1987 | Hasuo et al. ............. | 528/204 |
| 4,734,488 | 3/1988 | Hasuo et al. ............. | 528/196 |
| 4,997,903 | 3/1991 | Okamoto .................. | 528/198 |

*Primary Examiner*—Terressa Mosley
*Attorney, Agent, or Firm*—Oblon, Spivak, McClelland, Maier & Neustadt, P.C.

[57]           ABSTRACT

A digital video disc substrate comprising a polycarbonate is herein disclosed in which a main chain has a structure represented by the general formula (I)

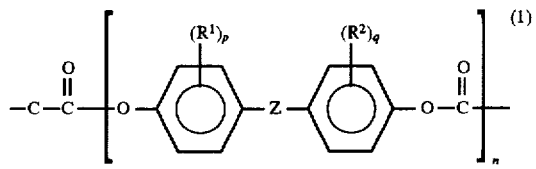

and at least 25 mol % of this terminal group is represented by the formula (III) or (IV)

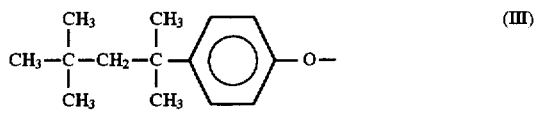

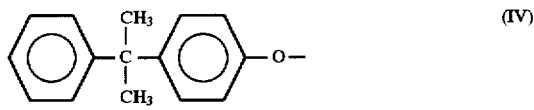

and a viscosity-average molecular weight is in the range of 10,000 to 17,000, preferably 12,500 to 14,500.

14 Claims, No Drawings

DIGITAL VIDEO SUBSTRATE

BACKGROUND OF THE INVENTION

1. Field of the Invention

The present invention relates to a digital video disc substrate (which is also called a DVD substrate or a digital versatile disc substrate), and more specifically, it relates to a digital video disc substrate comprising a polycarbonate which is scarcely broken during molding and is excellent in transferability and which has a small double refraction.

2. Description of the Related Arts

The standards of CDs, CD-ROMs and the like which are conventional optical discs are disc diameter=120 mm, disc thickness=1.2 mm, and structure=a single plate utilizing one surface. On the contrary, the standards of digital video discs (DVDs) are disc diameter=120 mm, disc thickness=1.2 mm, and structure=both surfaces stuck. Accordingly, the thickness of each video disc substrate is 0.6 mm.

Thus, as a result of the fact that the thickness of the disc substrate is reduced from 1.2 mm to 0.6 mm, inconveniences such as breakage of the discs during molding and the increase in double refraction take place. As materials of these discs, polycarbonates have often been used in recent years, because they are excellent in transparency, heat resistance, impact resistance and water resistance. In order to prevent the breakage of the discs during molding, the molecular weight of the polycarbonate which is the substrate material can be increased, but in this case, the double refraction further increases. On the other hand, in order to reduce the double refraction, it has been attempted to mold the digital video disc substrates by the use of techniques such as ultrasonic molding, multi-stage compression molding and high-speed filling molding. Even by these techniques, however, the reduction of the double refraction is not sufficient, and what is worse, the breakage of the discs more often occurs as compared with usual molding techniques.

SUMMARY OF THE INVENTION

Under such circumstances, the present invention has been attained, and an object of the present invention is to provide a digital video disc substrate which is scarcely broken during molding and is excellent in transferability and which has a small double refraction.

The present inventors have intensively researched on a digital video disc substrate which is scarcely broken during molding and which has a small double refraction, and as a result, it has been found that the above-mentioned object can be achieved by the use of a polycarbonate having a specific terminal structure and a specific molecular weight as a substrate material. The present invention has been completed on the basis of the thus found knowledge.

That is to say, the present invention is directed to a digital video disc substrate comprising a polycarbonate in which a main chain has a structure represented by the general formula (I)

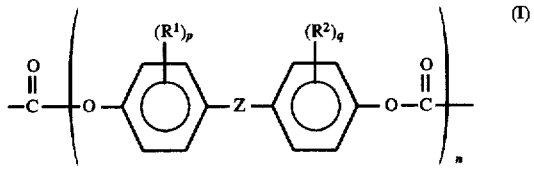

wherein $R^1$ and $R^2$ are each a halogen atom, an alkyl group having 1 to 6 carbon atoms or a phenyl group, and they may be the same or different from each other; Z is a single bond, an alkylene group or an alkylidene group having 1 to 20 carbon atoms, a cycloalkylene group or a cycloalkylidene group having 5 to 20 carbon atoms, —O—, —S—, —SO—, —SO$_2$— or —CO—; p and q are each an integer of 0 to 4; and n is the number of repeating units, and a terminal group represented by the general formula (II)

wherein $R^3$ is a halogen atom, an alkyl group having 1 to 20 carbon atoms or an aryl group having 6 to 20 carbon atoms; and r is an integer of 0 to 5, at least 25 mol % of this terminal group is a group represented by the formula (III)

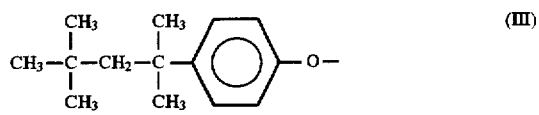

and a viscosity-average molecular weight is in the range of 10,000 to 17,000, or a polycarbonate in which at least 25 mol % of the terminal group is a group represented by the formula (IV)

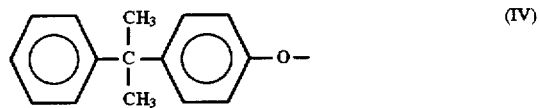

and a viscosity-average molecular weight is in the range of 12,500 to 14,500.

DETAILED DESCRIPTION OF THE PREFERRED EMBODIMENTS

A polycarbonate which can be used as a material for a digital video disc substrate of the present invention has a structure represented by the general formula (I):

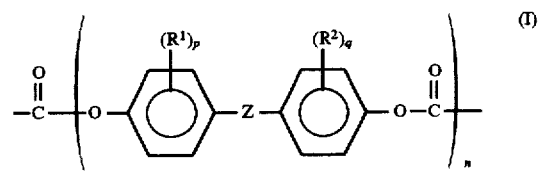

In the general formula (I), $R^1$ and $R^2$ are each a halogen atom, an alkyl group having 1 to 6 carbon atoms or a phenyl group. Here, examples of the halogen atom include a chlorine atom, a bromine atom, a fluorine atom and an iodine atom. The alkyl group having 1 to 6 carbon atoms may be any of a straight chain, a branched chain and a cyclic chain, and examples of the alkyl group include a methyl group, an ethyl group, an n-propyl group, an isopropyl group, an n-butyl group, an isobutyl group, a tert-butyl group, an amyl group, an isoamyl group, a hexyl group, an isohexyl group and a cyclohexyl group. $R^1$ and $R^2$ are the same or different from each other. If a plurality of $R^1$s are present, they may be the same or different, and if a plurality of $R^2$s are present, they may be the same or different. Moreover, p and q are each an integer of 0 to 4. Z is a single bond, an alkylene group or an alkylidene group having 1 to 20 carbon atoms, a cycloalkylene group or a cycloalkylidene group having 5 to 20 carbon atoms, —O—, —S—, —SO—, —SO$_2$— or —CO—. Here, examples of the alkylene group and the alkylidene group having 1 to 20 carbon atoms include a methylene group, an ethylene group, a propylene group, a butylene group, a pentylene group, a hexylene group, an ethylidene group and an isopropylidene group, and examples of the cycloalkylene group and the cycloalkylidene group having 5 to 20 carbon atoms include a cyclopentylene group, a cyclohexylene group, a cyclopentylidene group and a cyclohexylidene group. In addition, n is the number of repeating units, and it is such a number that the viscosity-average molecular weight of the polycarbonate is in the range of 10,000 to 17,000, or in the range of 12,500 to 14,500.

Furthermore, this polycarbonate is required to have a terminal group represented by the general formula (II):

In the above-mentioned general formula (II), $R^3$ is a halogen atom, an alkyl group having 1 to 20 carbon atoms or an aryl group having 6 to 20 carbon atoms. Here, examples of the halogen atom include a chlorine atom, a bromine atom, a fluorine atom and an iodine atom. The alkyl group having 1 to 20 carbon atoms may be any of a straight chain, a branched chain and a cyclic chain, and examples of the alkyl group include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group and a cyclohexyl group. On the other hand, the aryl group having 6 to 20 carbon atoms may have no substituent on an aromatic ring or may have a suitable substituent such as a lower alkyl group, and examples of the aryl group include a phenyl group, a tolyl group, a xylyl group, a naphthyl group and a methylnaphthyl group. Moreover, r is an integer of 0 to 5, and when r is 2 or more, i.e., when a plurality of $R^3$s are present, they may be the same or different. In the polycarbonate, one or more of the terminal groups represented by the general formula (II) may be contained, and examples of the suitable terminal group include a p-tert-butylphenoxyl group, a phenoxyl group and terminal groups represented by the following formulae (III) and (IV):

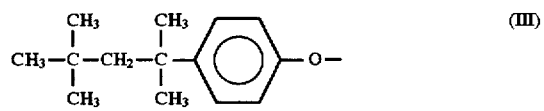

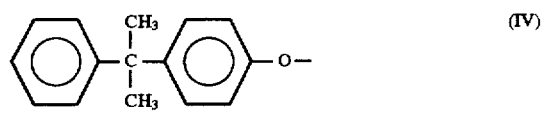

In the present invention, a 4-(1,1,3,3-tetramethylbutyl)phenoxyl group represented by the formula (III) or a p-cumylphenoxyl group represented by the formula (IV) is contained as an essential terminal group in an amount of at least 25 mol % based on the terminal group represented by the general formula (II). If this ratio of the terminal group is less than 25 mol %, the breakage of the discs is liable to occur during the molding of the digital video disc substrates. In order to effectively inhibit the breakage of the discs during the molding of the digital video disc substrates, a ratio of the terminal group represented by the formula (III) or the terminal group represented by the formula (IV) is preferably in the range of 50 to 100 mol %, more preferably 80 to 100 mol %. In the present invention, therefore, as the terminal group represented by the general formula (II), the terminal group represented by the abovementioned formula (III) or (IV) is preferable, or this terminal group and the p-tert-butylphenoxyl group or the phenoxyl group are preferable.

As techniques for regulating the ratio of the terminal group represented by any of the formulae (II) to (IV), there are a method which comprises using, at the preparation of the polycarbonate, as a terminal terminator, p-cumylphenol or 4-(1,1,3,3-tetramethylbutyl)phenol or a mixture of one of these phenols and another monovalent phenol represented by the general formula (V)

wherein $R^3$ and r are as defined above, and a method which comprises using, at the preparation of the polycarbonate, as the terminal terminators, one of p-cumylphenol and 4-(1,1,3,3-tetramethylbutyl)phenol, and another monovalent phenol represented by the above-mentioned general formula (V) to prepare a polycarbonate having the p-cumylphenoxyl groups or the 4-(1,1,3,3-tetramethylbutyl)phenoxyl groups at both terminals thereof and a polycarbonate having groups represented by the general formula (II) other than the p-cumylphenoxyl group and the 4-(1,1,3,3-tetramethylbutyl)phenoxyl group at both terminals thereof, and then mixing these polycarbonates.

Furthermore, with regard to the polycarbonate which can be used as the material of the disc substrate of the present invention, its viscosity-average molecular weight is required to be in the range of 10,000 to 17,000. If the viscosity-average molecular weight is less than 10,000, the breakage of the discs is liable to occur during the molding of the DVD substrates, and on the other hand, if it is more than 17,000, the double refraction of the DVD substrates increases. From the viewpoints of the breakage prevention during the molding of the DVD substrates and the increase prevention of the double refraction of the DVD substrates, this viscosity-average molecular weight is preferably in the range of 12,000 to 15,000, more preferably 12,500 to 14,500, and particularly in the case that at least 25% of the terminal groups is the group represented by the formula (IV), the viscosity-average molecular weight is preferably in the range of 12,500 to 14,500.

No particular restriction is put on a method for preparing the polycarbonate which can be used as the material of the DVD substrate of the present invention, and any method can be used, so long as it can obtain the polycarbonate having the above-mentioned characteristics. For example, the following two methods can preferably be used.

A first method comprises using, as a material monomer, a divalent phenol represented by the general formula (VI)

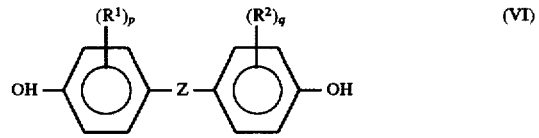

wherein $R^1$, $R^2$, Z, p and q are as defined above, reacting the above-mentioned divalent phenol dissolved in an aqueous alkali solution with phosgene in the presence of an inert organic solvent, adding, before or after the reaction, as terminal terminators, p-cumylphenol or 4-(1,1,3,3-tetramethylbutyl)phenol and another monovalent phenol represented by the above-mentioned general formula (V) in ratios of 25 to 100 mol % and 75 to 0 mol %, respectively, to carry out an interfacial polycondensation reaction, thereby obtaining the desired polycarbonate, or comprises dissolving the divalent phenol represented by the general formula (VI) and the abovementioned terminal terminator in pyridine or a mixed solvent of pyridine and an inert organic solvent, and blowing phosgene into this solution to carry out a reaction, thereby obtaining the desired polycarbonate.

Next, a second method comprises using, as terminal terminators, p-cumylphenol or 4-(1,1,3,3-tetramethylbutyl) phenol and another monovalent phenol represented by the above-mentioned general formula (V), carrying out the same procedure as in the above-mentioned first method to prepare a polycarbonate having the p-cumylphenoxyl groups or the 4-(1,1,3,3-tetramethylbutyl)phenoxyl groups at both terminals thereof and a polycarbonate having the other groups represented by the general formula (II) at both terminals thereof, and then mixing these polycarbonates so that the p-cumylphenoxyl groups or the 4-(1,1,3,3-tetramethylbutyl) phenoxyl groups may be in the range of 25 to 100 mol % and the other groups represented by the general formula (II) may be in the range of 75 to 0 mol %.

Examples of the divalent phenol represented by the above-mentioned general formula (VI) include various phenols, but 2,2-bis(4-hydroxyphenyl)propane [bisphenol A] is particularly preferable. Examples of the divalent phenols other than bisphenol A include dihydroxydiarylalkanes such as bis(4-hydroxyphenyl)methane, bis(3,5-dichloro-4-hydroxyphenyl)methane, bis(3,5-dimethyl-4-hydroxyphenyl)methane, 1,1-bis(4-hydroxyphenyl)ethane, 1,2-bis(4-hydroxyphenyl)ethane, 2-methyl-1,1-bis(4-hydroxyphenyl)propane, 2,2-bis-(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl) propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxypheyl)decane, 1,1-bis(4-hydroxyphenyl)-3,3,5-trimethylcyclohexane and 2,2-bis(4-hydroxyphenyl)-1,1,1,3,3,3-hexafluoropropane; dihydroxydiarylcycloalkanes such as 1,1-bis(4-hydroxyphenyl)cyclohexane, 1,1-bis(3,5-dichloro-4-hydroxyphenyl)cyclohexane and 1,1-bis(4-hydroxyphenyl) cyclodecane; dihydroxydiarylsulfones such as bis(4-hydroxyphenyl)sulfone, bis(3,5-dimethyl-4-hydroxyphenyl) sulfone and bis(3-chloro-4-hydroxyphenyl)sulfone; dihydroxydiaryl ethers such as bis(4-hydroxyphenyl) ether and bis(3,5-dimethyl-4-hydroxyphenyl) ether; dihydroxydiaryl ketones such as 4,4'-dihydroxybenzophenone and 3,3', 5,5'-tetramethyl-4,4'-dihydroxybenzophenone; dihydroxydiaryl sulfides such as bis(4-hydroxyphenyl) sulfide, bis(3-methyl-4-hydroxyphenyl) sulfide and bis(3,5-dimethyl-4-hydroxyphenyl) sulfide; and dihydroxydiaryl sulfoxides such as bis(4-hydroxyphenyl) sulfoxide. These divalent phenols may be used singly or in a combination of two or more thereof. Furthermore, a divalent carboxylic acid can be added to the reaction system to carry out a copolymerization.

On the other hand, examples of the monovalent phenol represented by the general formula (V) include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol and p-t-aminophenol. These monovalent phenols may be used singly or in a combination of two or more thereof. Above all, p-t-butylphenol and phenol are particularly preferable.

If necessary, the thus obtained polycarbonate may suitably be blended with various kinds of additives, so long as the object of the present invention is not impaired. Examples of the additives include an antioxidant, a lubricant (a mold release agent), an inorganic filler, a flame retardant and a colorant.

As the antioxidant, phosphorus-containing antioxidants are preferable, and examples of the phosphorus-containing antioxidants include trialkyl phosphites such as trimethyl phosphite, triethyl phosphite, tributyl phosphite, trioctyl phosphite, trinonyl phosphite, tridecyl phosphite, trioctadecyl phosphite, distearylpentaerythrityl diphosphite, tris(2-chloroethyl) phosphite and tris(2,3-dichloropropyl) phosphite; tricycloalkyl phosphites such as tricyclohexyl phosphite; triaryl phosphites such as triphenyl phosphite, tricresyl phosphite, tris(ethylphenyl) phosphite, tris (butylphenyl) phosphite, tris(nonylphenyl) phosphite and tris(hydroxyphenyl) phosphite; monoalkyldiaryl phosphites such as 2-ethylhexyldiphenyl phosphite; trialkyl phosphates such as trimethyl phosphate, triethyl phosphate, tributyl phosphate, trioctyl phosphate, tridecyl phosphate, trioctadecyl phosphate, distearylpentaerythrityl diphosphate, tris(2-chloroethyl) phosphate and tris(2,3-dichloropropyl) phosphate; tricycloalkyl phosphates such as tricyclohexyl phosphate; and triaryl phosphates such as triphenyl phosphate, tricresyl phosphate, tris(nonylphenyl) phosphate and 2-ethylphenyldiphenyl phosphate. These antioxidants may be used singly or in a combination of two or more thereof.

Furthermore, examples of the lubricant (the mold release agent) include stearyl alcohol, stearic acid monoglyceride, stearic acid esters such as pentaerythritol stearic acid ester, and beeswax. These lubricants have a function of improving mold release characteristics at the time of molding.

No particular restriction is put on a method for molding the DVD substrate of the present invention, and there can be used a molding material comprising the abovementioned polycarbonate and various kinds of components which can be used as needed. A mold for disc molding can be used, and a usual molding technique such as injection molding or compression molding can be used. In addition, ultrasonic molding, multi-stage compression molding or high-speed filling molding can also be employed.

A molding temperature is usually in the range of 300° to 390° C., preferably 300° to 345° C., and a mold temperature is usually in the range of 80° to 125° C. For the reduction of double refraction and the improvement of transferability, it is necessary to improve the fluidity of a resin, but if the molding temperature is more than 390° C., particularly more than 345° C., the deterioration of the polycarbonate occurs, and transparency is liable to lower. It is indispensable that the DVD substrate is excellent in the transparency. Furthermore, the mold temperature is preferably high from the viewpoint of the improvement of the fluidity, but if it is more than 125° C., the shape of the substrate is liable to be deformed. In addition, an injection rate is preferably 150 cm$^3$/sec or more, more preferably 200 cm$^3$/sec or more. If this injection rate is less than 150 cm$^3$/sec, the molding material in the mold is quenched, so that a fluid pressure loss increases and the orientation properties of the resin increase, with the result that a defect such as distortion tends to take place in molded articles. Moreover, no particular restriction is put on the material of the mold, and metals, ceramics and graphite can be used.

The thus obtained DVD substrates of the present invention are desirable as substrates for various digital video discs (DVD families) of an ROM type, a writing once type, a writable type and the like. No particular restriction is put on a method for manufacturing the digital video disc substrates by the use of the DVD substrates of the present invention, and the same method as in the case of the manufacture of usual compact discs can be used. For example, in a film formation step, a protective layer and a recording layer are formed on the substrate, and a hard coat layer and if necessary, an overcoat layer are further formed thereon to prepare two disc single plates, and they are stuck on each other by a usual manner, for example, by the use of a hot-melt adhesive or an adhesive sheet. Afterward, if necessary, the attachment of a hub is done to obtain the desired digital video disc.

Examples of the hot-melt adhesive which can be used in this case include ethylene-vinyl acetate copolymers (EVA), polyolefins, synthetic rubbers, polyesters and polyamides. On the other hand, examples of adhesives for the adhesive sheet include rubber adhesives, acrylic adhesives and silicone adhesives, and examples of materials for the sheet include resin sheets such as polyesters, polyimides, polyurethanes and polyolefins as well as metallic sheets such as aluminum foils.

A digital video disc substrate of the present invention comprises a polycarbonate having a specific terminal structure, and the substrate is scarcely broken during molding, has a small double refraction, and is excellent in transferability. Thus, this kind of substrates can suitably be used as substrates for digital video discs (DVD families) of an ROM type, a writing once type, a writable type and the like.

Next, the present invention will be described in more detail with reference to examples, but the scope of the present invention should not be limited to these examples at all.

Preparation Example 1 (Preparation of a polycarbonate oligomer)

60 kg of bisphenol A was dissolved in 400 liters of a 5 wt % aqueous sodium hydroxide solution to prepare an aqueous sodium hydroxide solution of bisphenol A.

Next, this aqueous sodium hydroxide solution of bisphenol A maintained at room temperature and methylene chloride were fed into a tubular reactor having an inner diameter of 10 mm and a length of 10 m through an orifice plate at flow rates of 138 liters/hr and 69 liters/hr, respectively, and phosgene was simultaneously blown thereinto at a flow rate of 10.7 kg/hr to continuously react them for 3 hours. The tubular reactor used herein was a double tube, and cooling water was circulated through a jacket portion to maintain the temperature of an effluent reaction solution at 25° C.

Furthermore, a pH of the effluent solution was regulated to be in the range of 10 to 22. The thus obtained reaction solution was allowed to stand, thereby separating and removing an aqueous phase, and a methylene chloride phase (220 liters) was collected to obtain the polycarbonate oligomer.

Preparation Example 2 (Preparation of a polycarbonate resin A)

166.7 g of p-cumylphenol was dissolved in 10.0 liters of the polycarbonate oligomer obtained in Preparation Example 1, and an aqueous sodium hydroxide solution (NaOH=75 g, water =1.0 liter) and 1.17 ml of triethylamine were added to the solution, followed by stirring at ordinary temperature at 300 rpm for 30 minutes. Next, 8 liters of methylene chloride and an aqueous sodium hydroxide solution of bisphenol A (bisphenol A=607 g, NaOH=320 g, water=5 liters) were added, followed by stirring at ordinary temperature at 500 rpm for 1 hour.

Afterward, 5 liters of methylene chloride and 5 liters of water were added, followed by stirring at ordinary temperature at 500 rpm for 10 minutes. After the stop of the stirring, the solution was allowed to stand for separation, so that an organic phase was obtained. This organic phase was successively subjected to alkali washing with 5 liters of a 0.03N aqueous sodium hydroxide solution, acid washing with 5 liters of 0.2N hydrochloric acid, and water washing (twice) with 5 liters of water. Afterward, methylene chloride was distilled off to obtain the polycarbonate resin A in the state of flakes.

Preparation Example 3 (Preparation of a polycarbonate resin B)

The same procedure as in Preparation Example 2 was repeated except that 166.7 g of p-cumylphenol was replaced with 118.0 g of p-tert-butylphenol, thereby obtaining the polycarbonate resin B.

Preparation Example 4 (Preparation of a polycarbonate resin C)

The same procedure as in Preparation Example 2 was repeated except that 166.7 g of p-cumylphenol was replaced with 73.9 g of phenol, thereby obtaining the polycarbonate resin C.

Preparation Example 5 (Preparation of a polycarbonate resin D)

The same procedure as in Preparation Example 2 was repeated except that 166.7 g of p-cumylphenol was replaced with 141.7 g of p-cumylphenol and 17.7 g of p-tert-butylphenol, thereby obtaining the polycarbonate resin D. In this case, a molar ratio of p-cumylphenol:p-tert-butylphenol was 85:15.

Preparation Example 6 (Preparation of a polycarbonate resin E)

The same procedure as in Preparation Example 2 was repeated except that 166.7 g of p-cumylphenol was changed to 188.4 g, thereby obtaining the polycarbonate resin E.

Preparation Example 7 (Preparation of a polycarbonate resin F)

The same procedure as in Preparation Example 2 was repeated except that 166.7 g of p-cumylphenol was replaced with 133.3 g of p-tert-butylphenol, thereby obtaining the polycarbonate resin F.

Preparation Example 8 (Preparation of a polycarbonate resin G)

The same procedure as in Preparation Example 2 was repeated except that 166.7 g of p-cumylphenol was replaced with 52.4 g of p-cumylphenol and 86.4 g of p-tert-butylphenol, thereby obtaining the polycarbonate resin G. In this case, a molar ratio of p-cumylphenol:p-tert-butylphenol was 30:70.

Preparation Example 9 (Preparation of a polycarbonate resin H)

The same procedure as in Preparation Example 2 was repeated except that 166.7 g of p-cumylphenol was replaced with 34.9 g of p-cumylphenol and 98.8 g of p-tert-butylphenol, thereby obtaining the polycarbonate resin H. In this case, a molar ratio of p-cumylphenol:p-tert-butylphenol was 20:80.

Preparation Example 10 (Preparation of a polycarbonate resin I)

The same procedure as in Preparation Example 2 was repeated except that 166.7 g of p-cumylphenol was changed to 117.2 g, thereby obtaining the polycarbonate resin I.

Preparation Example 11 (Preparation of a polycarbonate resin J)

The same procedure as in Preparation Example 2 was repeated except that 166.7 g of p-cumylphenol was changed to 362.0 g, thereby obtaining the polycarbonate resin J.

Examples 1 to 8 and Comparative Examples 1 to 7

In each example, components in Table 1 were dry-blended in a blend ratio shown in Table 1, and the thus obtained blend was extruded at 230° C. to obtain pellets. In this case, tris(2,4-di-tert-butylphenyl) phosphite was used as an antioxidant, and stearic acid monoglyceride was used as a mold release agent. The values of a viscosity-average molecular weight (Mv) of the obtained pellets are shown in Table 1.

This viscosity-average molecular weight (Mv) can be calculated in accordance with the equation:

$$[\eta] = 1.23 \times 10^{-5} \cdot M_v^{0.83}$$

wherein [η] is an intrinsic viscosity of a methylene chloride solution at 20° C., which can be measured by a Ubbelohde's viscometer.

Next, the obtained pellets were injection-molded under conditions of a molding machine=IS80EPN made by Toshiba Machine Co., Ltd., mold clamping force=50 tons, injection rate=250 cm³/sec, injection pressure=2600 kg/cm², mold material=duralumin 2024, molding temperature=340° C., mold temperature=115° C., cooling time=5 seconds and cavity portion=electroless nickel plating to prepare DVD substrates each having a diameter of 120 mm and a thickness of 0.6 mm.

In each example, 100 DVD substrates were molded, and the numbers of the substrates which were not broken are shown in Table 2. In addition, after 48 hours had lapsed from the completion of the molding, the falling weight impact strength of each molded article was measured under a load of 3.76 kg at a velocity of 1 m/sec by the use of a receiving base having a long diameter of 50 mm. In this connection, Table 2 shows the values of energy (J) of the falling weight impact strength at a time when a position having a radius of 18 mm in the inside of the molded article was struck.

Moreover, for the DVD substrates obtained in Example 1 and 6 to 8 as well as Comparative Examples 1, 5 and 6, transferability and double refraction (Δn) were measured.

Here, the transferability means an average of values of [a height of a convex on the molded article/a depth of a concave on the surface of the mold (5 μm)]×100 at 20 positions. For measurement, a measure scope UM-3 made by Nikon Co., Ltd. was used. The results are shown in Table 3.

Furthermore, the double refraction (Δn) was measured at optionally selected points on circumferences of circles depicted at distances of 30 mm and 50 mm from the center of each disc by the use of a double refraction measurement system ADR-2000 made by Oak Co., Ltd. Table 3 shows absolute values (R=Δn·t) of retardation wherein t is a thickness (nm) of the disc.

TABLE 1

| | Blend Ratio | | | | |
|---|---|---|---|---|---|
| | Polycarbonate Resin | | Additive (wt ppm) | | Viscosity-Average |
| | Kind | Ratio (wt %) | Anti-oxidant | Release Agent | Molecular Weight [Mv] |
| Example 1 | A | 100 | 50 | 100 | 14500 |
| Example 2 | D | 100 | 50 | 100 | 14400 |
| Example 3 | A | 50 | 50 | 100 | 14500 |
| | B | 50 | | | |
| Example 4 | A | 70 | 50 | 100 | 14500 |
| | C | 30 | | | |
| Example 5 | A | 100 | — | — | 14400 |
| Example 6 | E | 100 | 50 | 100 | 13200 |
| Example 7 | E | 90 | 50 | 100 | 13200 |
| | F | 10 | | | |
| Example 8 | G | 100 | 50 | 100 | 14000 |
| Comp. Ex. 1 | B | 100 | 50 | 100 | 14500 |
| Comp. Ex. 2 | C | 100 | 50 | 100 | 14500 |
| Comp. Ex. 3 | B | 100 | — | — | 14400 |
| Comp. Ex. 4 | F | 100 | 50 | 100 | 13200 |
| Comp. Ex. 5 | H | 100 | 50 | 100 | 14000 |
| Comp. Ex. 6 | I | 100 | 50 | 100 | 19000 |
| Comp. Ex. 7 | J | 100 | 50 | 100 | 8000 |

TABLE 2

| | Number of Substrates Which Were Not Broken | Falling Weight Impact Strength (J) |
|---|---|---|
| Example 1 | 100 | 0.62 |
| Example 2 | 100 | 0.60 |
| Example 3 | 90 | 0.52 |
| Example 4 | 65 | 0.41 |
| Example 5 | 100 | 0.61 |
| Example 6 | 100 | 0.55 |
| Example 7 | 100 | 0.54 |
| Example 8 | 55 | 0.39 |
| Comp. Ex. 1 | 5 | 0.10 |
| Comp. Ex. 2 | 4 | 0.09 |
| Comp. Ex. 3 | 0 | — |
| Comp. Ex. 4 | 0 | — |
| Comp. Ex. 5 | 15 | 0.18 |
| Comp. Ex. 6 | 100 | 0.70 |
| Comp. Ex. 7 | 0 | — |

TABLE 3

| | Transferability (%) | Retardation (nm) | |
|---|---|---|---|
| | | 30 mm | 50 mm |
| Example 1 | 93 | 55 | 57 |
| Example 6 | 93 | 19 | 12 |
| Example 7 | 93 | 19 | 12 |
| Example 8 | 92 | 55 | 56 |
| Comp. Ex. 1 | 92 | 57 | 58 |
| Comp. Ex. 5 | 92 | 56 | 57 |
| Comp. Ex. 6 | 93 | 210 | 220 |

Preparation Example 12 (Preparation of a polycarbonate resin K)

162.0 g of 4-(1,1,3,3-tetramethylbutyl)phenol was dissolved in 10.0 liters of a polycarbonate oligomer solution obtained in Preparation Example 1, and an aqueous sodium hydroxide solution (NaOH=75 g, water=1.0 liter) and 1.17 ml of triethylamine were added to the solution, followed by stirring at ordinary temperature at 300 rpm for 30 minutes.

11

Next, 8 liters of methylene chloride and an aqueous sodium hydroxide solution of bisphenol A (bisphenol A=607 g, NaOH=320 g, water=5 liters) were added, followed by stirring at ordinary temperature at 500 rpm for 1 hour.

Afterward, 5 liters of methylene chloride and 5 liters of water were added, followed by stirring at ordinary temperature at 500 rpm for 10 minutes. After the stop of the stirring, the solution was allowed to stand for the sake of separation, so that an organic phase was obtained. This organic phase was successively subjected to alkali washing with 5 liters of a 0.03N aqueous sodium hydroxide solution, acid washing with 5 liters of 0.2N hydrochloric acid, and water washing (twice) with 5 liters of water. Afterward, methylene chloride was distilled off to obtain the polycarbonate resin K in the state of flakes.

Preparation Example 13 (Preparation of a polycarbonate resin L)

The same procedure as in Preparation Example 12 was repeated except that 162.0 g of 4-(1,1,3,3-tetramethylbutyl) phenol was replaced with 118.0 g of p-tert-butylphenol, thereby obtaining the polycarbonate resin L.

Preparation Example 14 (Preparation of a polycarbonate resin M)

The same procedure as in Preparation Example 12 was repeated except that 162.0 g of 4-(1,1,3,3-tetramethylbutyl) phenol was replaced with 73.9 g of phenol, thereby obtaining the polycarbonate resin M.

Preparation Example 15 (Preparation of a polycarbonate resin N)

The same procedure as in Preparation Example 12 was repeated except that 162.0 g of 4-(1,1,3,3-tetramethylbutyl) phenol was replaced with 137.7 g of 4-(1,1,3,3-tetramethylbutyl)phenol and 17.7 g of p-tert-butylphenol, thereby obtaining the polycarbonate resin N. In this case, a molar ratio of 4-(1,1,3,3-tetramethylbutyl)phenol:p-tert-butylphenol was 85:15.

Preparation Example 16 (Preparation of a polycarbonate resin O)

The same procedure as in Preparation Example 12 was repeated except that 162.0 g of 4-(1,1,3,3-tetramethylbutyl) phenol was changed to 183.1 g, thereby obtaining the polycarbonate resin O.

Preparation Example 17 (Preparation of a polycarbonate resin P)

The same procedure as in Preparation Example 12 was repeated except that 162.0 g of 4-(1,1,3,3-tetramethylbutyl) phenol was replaced with 133.3 g of p-tert-butylphenol, thereby obtaining the polycarbonate resin P.

Preparation Example 18 (Preparation of a polycarbonate resin Q)

The same procedure as in Preparation Example 12 was repeated except that 162.0 g of 4-(1,1,3,3-tetramethylbutyl) phenol was replaced with 50.9 g of 4-(1,1,3,3-tetramethylbutyl)phenol and 86.4 g of p-tert-butylphenol, thereby obtaining the polycarbonate resin Q. In this case, a molar ratio of 4-(1,1,3,3-tetramethylbutyl)phenol:p-tert-butylphenol was 30:70.

Preparation Example 19 (Preparation of a polycarbonate resin R)

The same procedure as in Preparation Example 12 was repeated except that 162.0 g of 4-(1,1,3,3-tetramethylbutyl) phenol was replaced with 33.9 g of 4-(1,1,3,3-tetramethylbutyl)phenol and 98.8 g of p-tert-butylphenol, thereby obtaining the polycarbonate resin R. In this case, a molar ratio of 4-(1,1,3,3-tetramethylbutyl)phenol:p-tert-butylphenol was 20:80.

12

Preparation Example 20 (Preparation of a polycarbonate resin S)

The same procedure as in Preparation Example 12 was repeated except that 162.0 g of 4-(1,1,3,3-tetramethylbutyl) phenol was changed to 113.9 g, thereby obtaining the polycarbonate resin S.

Preparation Example 21 (Preparation of a polycarbonate resin T)

The same procedure as in Preparation Example 12 was repeated except that 162.0 g of 4-(1,1,3,3-tetramethylbutyl) phenol was changed to 351.8 g, thereby obtaining the polycarbonate resin T.

Preparation Example 22 (Preparation of a polycarbonate resin U)

The same procedure as in Preparation Example 12 was repeated except that 162.0 g of 4-(1,1,3,3-tetramethylbutyl) phenol was replaced with 183.1 g of 4-(n-octyl)phenol, thereby obtaining the polycarbonate resin U.

Examples 9 to 16 and Comparative Examples 8 to 14

In each example, components in Table 4 were dry-blended in a blend ratio shown in Table 4, and the thus obtained blend was extruded at 230° C. to obtain pellets. In this case, tris(2,4-di-tert-butylphenyl) phosphite was used as an antioxidant, and stearic acid monoglyceride was used as a mold release agent. The values of a viscosity-average molecular weight (Mv) of the obtained pellets were measured in the same manner as in Example 1, and the results are shown in Table 4.

Next, the obtained pellets were injection-molded under conditions of a molding machine=IS80EPN made by Toshiba Machine Co., Ltd., mold clamping force=50 tons, injection rate=250 cm$^3$/sec, injection pressure=1500 kg/cm$^2$, mold material=duralumin 2024, molding temperature=340° C., mold temperature=115° C., cooling time=5 seconds and cavity portion=electroless nickel plating to prepare DVD substrates each having a diameter of 120 mm and a thickness of 0.6 mm.

In each example, 100 DVD substrates were molded, and the number of the substrates which were not broken is shown in Table 5. Here, the breakage means that a sprue portion is cut off from a disc and the sprue portion remains in the molding machine. In addition, after 48 hours had lapsed from the completion of the molding, the falling weight impact strength of each molded article was measured under a load of 3.76 kg at a velocity of 1 m/sec by the use of a receiving base having a long diameter of 50 mm. In this connection, Table 5 shows the values of energy (J) of the falling weight impact strength at a time when a position having a radius of 18 mm on the inside of the molded article was struck.

Moreover, for the DVD substrates obtained in Example 9 and 14 to 16 as well as Comparative Examples 8, 12 and 13, transferability and double refraction (Δn) were measured in the same manner as in Example 1.

TABLE 4

| | Blend Ratio | | | | |
|---|---|---|---|---|---|
| | Polycarbonate Resin | | Additive (wt ppm) | | Viscosity-Average Molecular Weight [Mv] |
| | Kind | Ratio (wt %) | Anti-oxidant | Release Agent | |
| Example 9 | K | 100 | 50 | 100 | 14400 |
| Example 10 | N | 100 | 50 | 100 | 14500 |
| Example 11 | K | 50 | 50 | 100 | 14400 |

TABLE 4-continued

| | Blend Ratio | | | |
|---|---|---|---|---|
| | Polycarbonate Resin | | Additive (wt ppm) | Viscosity-Average |
| | Kind | Ratio (wt %) | Anti-oxidant / Release Agent | Molecular Weight [Mv] |
| | L | 50 | | |
| Example 12 | K | 70 | 50 / 100 | 14500 |
| | M | 30 | | |
| Example 13 | K | 100 | — / — | 14400 |
| Example 14 | O | 100 | 50 / 100 | 13200 |
| Example 15 | O | 90 | 50 / 100 | 13300 |
| | P | 10 | | |
| Example 16 | Q | 100 | 50 / 100 | 14000 |
| Comp. Ex. 8 | L | 100 | 50 / 100 | 14000 |
| Comp. Ex. 9 | M | 100 | 50 / 100 | 14500 |
| Comp. Ex. 10 | L | 100 | — / — | 14400 |
| Comp. Ex. 11 | P | 100 | 50 / 100 | 13200 |
| Comp. Ex. 12 | R | 100 | 50 / 100 | 14100 |
| Comp. Ex. 13 | S | 100 | 50 / 100 | 19000 |
| Comp. Ex. 14 | T | 100 | 50 / 100 | 8200 |
| Comp. Ex. 15 | U | 100 | 50 / 100 | 13200 |

TABLE 5

| | Number of Substrates Which Were Not Broken | Falling Weight Impact Strength (J) |
|---|---|---|
| Example 9 | 100 | 0.63 |
| Example 10 | 100 | 0.59 |
| Example 11 | 92 | 0.51 |
| Example 12 | 62 | 0.40 |
| Example 13 | 100 | 0.60 |
| Example 14 | 100 | 0.56 |
| Example 15 | 100 | 0.55 |
| Example 16 | 52 | 0.39 |
| Comp. Ex. 8 | 5 | 0.10 |
| Comp. Ex. 9 | 4 | 0.09 |
| Comp. Ex. 10 | 0 | — |
| Comp. Ex. 11 | 0 | — |
| Comp. Ex. 12 | 13 | 0.18 |
| Comp. Ex. 13 | 100 | 0.70 |
| Comp. Ex. 14 | 0 | — |
| Comp. Ex. 15 | 0 | — |

TABLE 6

| | Transferability (%) | Retardation (nm) | |
|---|---|---|---|
| | | 30 mm | 50 mm |
| Example 9 | 93 | 56 | 58 |
| Example 14 | 93 | 19 | 12 |
| Example 15 | 93 | 19 | 12 |
| Example 16 | 93 | 55 | 57 |
| Comp. Ex. 8 | 92 | 57 | 58 |
| Comp. Ex. 12 | 92 | 56 | 57 |
| Comp. Ex. 13 | 93 | 205 | 220 |

What is claimed is:

1. A digital video disc substrate comprising a polycarbonate in which a main chain has a structure represented by the general formula (I)

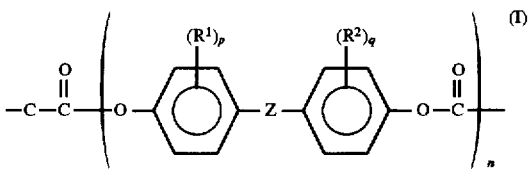

wherein $R^1$ and $R^2$ are each a halogen atom, an alkyl group having 1 to 6 carbon atoms or a phenyl group; Z is a single bond, an alkylene group or an alkylidene group having 1 to 20 carbon atoms, a cycloalkylene group or a cycloalkylidene group having 5 to 20 carbon atoms, —O—, —S—, —SO—, —SO$_2$— or —CO—; p and q are each an integer of 0 to 4; and n is the number of repeating units, and a terminal group represented by the general formula (II)

wherein $R^3$ is a halogen atom, an alkyl group having 1 to 20 carbon atoms or an aryl group having 6 to 20 carbon atoms; and r is an integer of 0 to 5, at least 25 mol % of this terminal group is a group represented by the formula (III)

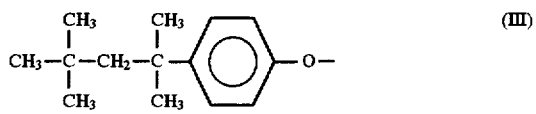

and a viscosity-average molecular weight is in the range of 10,000 to 17,000, wherein the viscosity-average molecular weight is determined by viscosity measurements in a methylene chloride solution at 20° C.

2. A digital video disc substrate comprising a polycarbonate in which a main chain has a structure represented by the general formula (I)

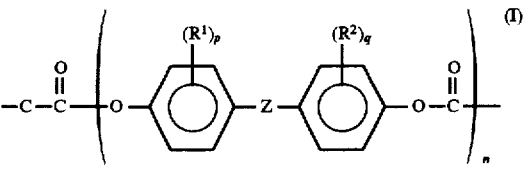

wherein $R^1$ and $R^2$ are each a halogen atom, an alkyl group having 1 to 6 carbon atoms or a phenyl group; Z is a single bond, an alkylene group or an alkylidene group having 1 to 20 carbon atoms, a cycloalkylene group or a cycloalkylidene group having 5 to 20 carbon atoms, —O—, —S—, —SO—, —SO$_2$— or —CO—; p and q are each an integer of 0 to 4; and n is the number of repeating units, and a terminal group represented by the general formula (II)

wherein $R^3$ is a halogen atom, an alkyl group having 1 to 20 carbon atoms or an aryl group having 6 to 20 carbon atoms; and r is an integer of 0 to 5, at least 25 mol % of this terminal group is a group represented by the formula (IV)

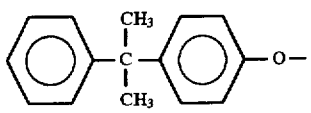 (IV)

and a viscosity-average molecular weight is in the range of 12,500 to 14,500, wherein the viscosity-average molecular weight is determined by viscosity measurements in a methylene chloride solution at 20° C.

3. The digital video disc substrate according to claim 1 wherein the terminal group represented by the general formula (II) is the terminal group represented by the formula (III), or the terminal group represented by the formula (III) and a p-tert-butylphenoxyl group or a phenoxyl group.

4. The digital video disc substrate according to claim 1 wherein at least 80% of the terminal group represented by the general formula (II) is the terminal group represented by the formula (III).

5. The digital video disc substrate according to claim 4 wherein the viscosity-average molecular weight is in the range of 12,500 to 14,500.

6. The digital video disc substrate according to claim 1 wherein the viscosity-average molecular weight is in the range of 12,500 to 14,500.

7. The digital video disc substrate according to claim 2 wherein the terminal group represented by the general formula (II) is the terminal group represented by the formula (IV), or the terminal group represented by the formula (IV) and a p-tert-butylphenoxyl group or a phenoxyl group.

8. The digital video disc substrate according to claim 2 wherein at least 80% of the terminal group represented by the general formula (II) is the terminal group represented by the formula (IV).

9. The digital video disc substrate according to claim 1 wherein the main chain represented by the general formula (I) is formed by polycondensation of 2,2-bis(4-hydroxyphenyl)propane and phosgene.

10. The digital video disc substrate of claim 1, wherein $R^1$ and $R^2$ are the same.

11. The digital video disc substrate of claim 1, wherein $R^1$ and $R^2$ are different.

12. The digital video disc substrate of claim 2, wherein $R^1$ and $R^2$ are the same.

13. The digital video disc substrate of claim 2, wherein $R^1$ and $R^2$ are different.

14. The digital video disc substrate according to claim 2 wherein the main chain represented by the general formula (I) is formed by polycondensation of 2,2-bis (4-hydroxyphenyl) propane and phosgene.

* * * * *